United States Patent [19]

McCormick

[11] 4,396,309

[45] Aug. 2, 1983

[54] CONNECTING ROD CAP ALIGNMENT

[75] Inventor: Daniel F. McCormick, Oshkosh, Wis.

[73] Assignee: Brunswick Corporation, Skokie, Ill.

[21] Appl. No.: 187,110

[22] Filed: Sep. 15, 1980

[51] Int. Cl.³ ............................................. F16B 19/02
[52] U.S. Cl. ...................................... 403/14; 403/408;
74/579 E
[58] Field of Search ...................... 74/579 E, 597, 598;
403/13, 14, 280, 408; 308/23, 74; 29/157.5 A,
525, 526; 123/197 AB, 197 AC; 105/84

[56] References Cited

U.S. PATENT DOCUMENTS

| | | | |
|---|---|---|---|
| 1,720,269 | 7/1929 | Fullerton | 403/280 |
| 2,196,144 | 4/1940 | Eckler | 29/526 R UX |
| 2,407,928 | 9/1946 | Herreshoff et al. | 74/579 E X |
| 2,912,031 | 11/1959 | Bensinger et al. | 74/579 E UX |
| 3,115,356 | 12/1963 | Hohwart | 308/74 X |
| 3,314,701 | 4/1967 | Durham | 29/526 UX |
| 3,455,587 | 7/1969 | Gallois | . |
| 3,790,236 | 2/1974 | Pierce | 74/579 E X |
| 3,962,775 | 6/1976 | King, Jr. | 29/526 |
| 3,971,119 | 7/1976 | Walker | 29/156.5 A X |
| 3,994,054 | 11/1976 | Cuddon-Fletcher | 29/156.5 A |
| 4,138,780 | 2/1979 | Jarmann | 29/525 |

Primary Examiner—Andrew V. Kundrat
Attorney, Agent, or Firm—O. T. Sessions

[57] ABSTRACT

The invention provides a connecting rod bolt (10) for maintaining precise alignment of the connecting rod (11) with the connecting rod cap (14). The connecting rod bolt (10) has a section (31) knurled to a diameter larger than the bores (30) in the rod and cap with which it mates. Upon insertion of the bolt (10) into the bore (30) the bolt will be precisely matched to the bore.

1 Claim, 2 Drawing Figures

CONNECTING ROD CAP ALIGNMENT

DESCRIPTION

1. Technical Field

This invention relates to connecting rods for internal combustion engines and particularly to the attachment of the connecting rod cap to the connecting rod.

Proper alignment of the connecting rod and connecting rod cap is important since it determines the alignment of the two internal bearing surfaces of the crankshaft end of the connecting rod. This alignment is particularly important when roller bearings are used between the internal bearing surface of the connecting rod and the crank pin.

2. Background Art

A rod and cap formed from an integral blank and cracked apart to create precisely mating surfaces is disclosed in U.S. Pat. No. 3,994,054. This method provides closely aligned bearing surfaces suitable for use with roller bearings. Though generally satisfactory, the mating surfaces could be clamped together when not precisely aligned, thereby ruining the connecting rod and cap.

Many other arrangements, including interlocking rods and caps and external aligning surfaces have been used to provide bearing surfaces aligned sufficiently close for use with roller or needle bearings.

A variety of connecting means are used in piston engines which use plain bearings between the connecting rod and crank shaft. For example, U.S. Pat. No. 3,455,587 discloses the use of a connecting rod bolt for a diesel engine in which grooves are provided in the portion of the bolt contacting the bores in the rod and cap. These grooves prevent the propagation of fatigue cracks in the bolt surface. Other connecting rods, for example, in automotive engines use connecting rod bolts on which a knurled portion is used to provide a larger diameter. The knurled portion is then machined or ground to provide a close fit with the bore in which the bolt is used. The fit provided by these arrangements, however, is not close enough to provide an adequate alignment of the rod and cap to permit the use of roller bearings between the rod and crankshaft.

DISCLOSURE OF INVENTION

A connecting rod assembly for use in an internal combustion engine has a connecting rod and cap, which having at least one cylindrical bore, the bores being coaxial end of uniform diameter. A fastening member is inserted in the bores to hold the rod and cap together. The fastening member has at least one bearing portion for engaging the walls of the bores, with the bearing portion having a diameter greater than the diameter of the bores before insertion in the bores. The bearing portion of the fastening member is sized to fit the bores by the initial insertion of the fastening member into the bore. The bearing portion of the fastening member is provided with a roughened or knurled surface to allow the bearing portion to deform as it is initially inserted in the bore.

The invention is particularly suitable for use in engines utilizing roller or needle bearings between the connecting rod and crankshaft, since it provides precise alignment of the semi-circular bearing faces formed on connecting rod and cap. A pair of fastening members or bolts, mounted one on each side of the bearing serves to align the bearing surfaces and hold the rod and cap together.

BEST MODE FOR CARRYING OUT THE INVENTION

Figure 1:
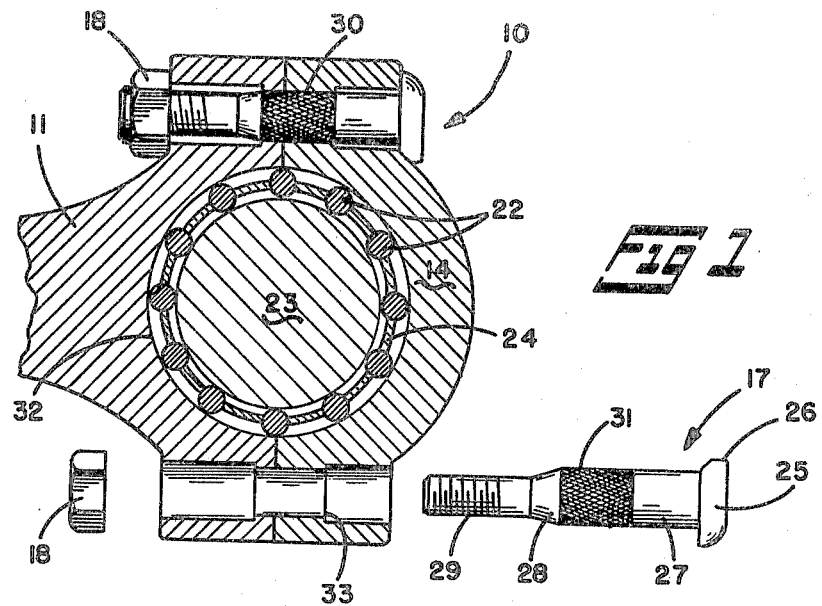
FIG. 1 is a cross-section of a connecting rod and crank pin according to the invention.
Figure 2:
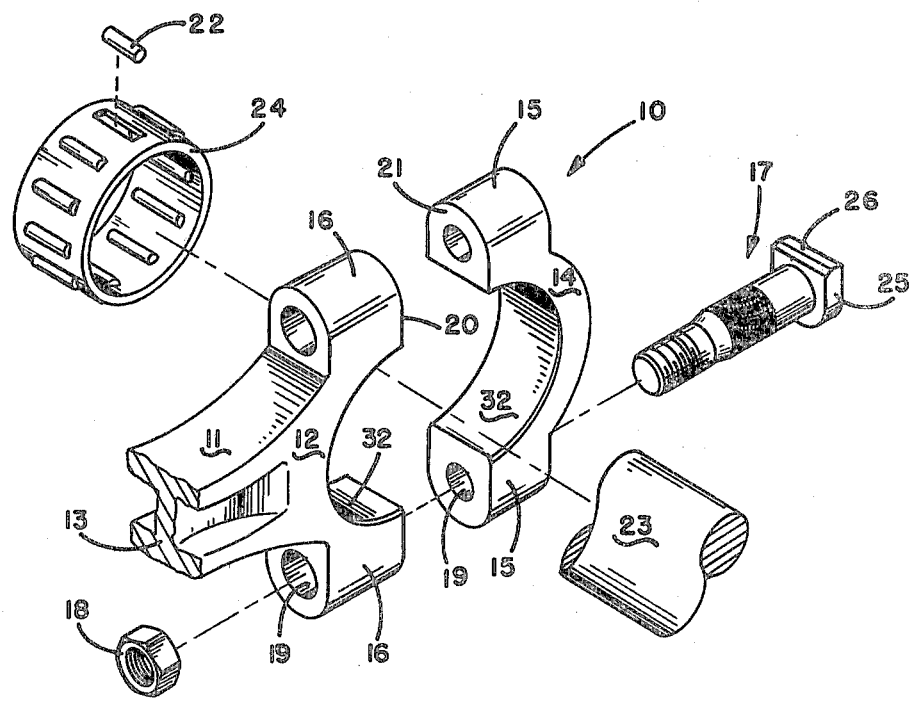
FIG. 2 is an exploded view of the connecting rod bearing assembly of FIG. 1.

The connecting rod assembly 10 shown in the figures illustrates the crank end of a connecting rod 11 for use in a two-cycle outboard motor engine, not illustrated. The crank end of the connecting rod includes a saddle portion 12 formed on the end of the connecting rod shank 13. A cap 14 has two lugs 15 matching two lugs 16 on the saddle, and connecting rod bolts 17 and nuts 18, inserted in bores 19 through the lugs 15 and 16, attach the cap 14 to the connecting rod 11. The mating surfaces 20 and 21 of the rod 11, and cap 14 are ground flat, though a cracked surface such as that disclosed in U.S. Pat. No. 3,994,054 could be used. Roller or needle bearings 22 are provided between the crank pin 23 and connecting rod 11. The roller bearings 22 may be provided with a cage 24, as illustrated or may be inserted loose, without a cage.

The connecting rod bolts 17 in the preferred embodiments are formed of SAE 8740 steel and have a conventional head 25 with a flat side 26 to prevent rotation of the bolt and provide a single assembled position. The bolt 17 includes a large diameter section 27 nominally 0.254 inch followed by a tapered section 28 to reduce the diameter to that of the ¼ inch diameter threaded section. The portion of the bolt 17 which will engage the reduced diameter bore 30 in the connecting rod and cap lugs 15 and 16 is knurled in a diamond pattern, though any pattern could be used to raise the outer diameter which is then machined to a nominal 0.2665 inches. Prior to assembly the diameter of the knurled portion 31 should be 0.001 to 0.0015 inches larger than the diameter of the reduced diameter bores 30 to be engaged.

Because of the roller or needle bearings 22, great care must be used to provide close alignment between the bearing surfaces on the connecting rod 11 and cap 14. In the present device the smaller diameter bores 30 through the rod and cap lugs 15 and 16 are held together to provide uniform diameter, coaxial bores 30 adjacent the mating surfaces 20 and 21 of the rod 11 and cap 14. The larger diameter bores 19 are used away from the mating surfaces 20 and 21 to provide seats for the bolt head 25 and nut 18. Next the connecting rod bolts 17 are pressed into the bores 30 and the knurled portion 31 of the bolt 17 is reduced to the diameter of the bores 30 by being forced into the bore 30. Then the bearing surface 32 is ground to its final shape. The resulting assembly can now be disassembled and upon reassembly, with the crank pin 23, the bearing surfaces 32 on the rod 11 and cap 14 will be aligned. Furthermore, should a connecting rod bolt 17 be damaged replacement with a new bolt will preserve the alignment of the rod 11 and cap 14 since the knurled portion 31 of the new bolt 17 will be sized by the leading edge 33 of the bore 30 in the cap 14 as it is inserted.

I claim:

1. A connecting rod assembly for use in an internal combustion engine of the type having roller bearings between the connecting rod and crankshaft, said assembly comprising:

(A) a connecting rod having a semi-circular bearing face and a cylindrical bore on each side of said bearing face;

(B) a connecting rod cap having a semi-circular bearing face, said rod and cap bearing faces forming a circular bearing surface for engaging said roller bearings, said rod cap having a cylindrical bore on each side of said cap bearing face, said cap bores being coaxial with said rod bores and having the same diameters as the corresponding rod bores; and (C) separable and reusable fastening members inserted in each pair of said coaxial bores to hold said rod and cap together, said fastening members each having a bearing portion having a diameter greater than the diameter of said bores prior to insertion in said bores, said bearing portion engaging said bores in both said body and said cap, said bearing portion having a knurled surface having a diameter within preset limits larger than the diameter of said bores so as to provide adequate alignment to accommodate said roller bearings upon reassembly;

whereby said bearing portions of said fastening members deform to conform to the walls of said bores upon assembly.

* * * * *